(12) United States Patent
Lahijani

(10) Patent No.: US 8,960,271 B2
(45) Date of Patent: Feb. 24, 2015

(54) DOWNHOLE WELL COMMUNICATIONS CABLE

(75) Inventor: Jacob Lahijani, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 537 days.

(21) Appl. No.: 13/193,672

(22) Filed: Jul. 29, 2011

(65) Prior Publication Data

US 2012/0031607 A1 Feb. 9, 2012

Related U.S. Application Data

(60) Provisional application No. 61/371,263, filed on Aug. 6, 2010.

(51) Int. Cl.
*E21B 47/12* (2012.01)
*H01B 7/29* (2006.01)
*C08L 27/18* (2006.01)

(52) U.S. Cl.
CPC ............... *H01B 7/292* (2013.01); *C08L 27/18* (2013.01); *C08L 2205/02* (2013.01)
USPC ...................................... 166/65.1

(58) Field of Classification Search
USPC .......................................... 166/250.01, 65.1
See application file for complete search history.

(56) References Cited

U.S. PATENT DOCUMENTS

| | | | |
|---|---|---|---|
| 3,635,926 A | 1/1972 | Gresham et al. | |
| 3,832,481 A | 8/1974 | Boyd et al. | |
| 4,029,865 A | 6/1977 | Varglu et al. | |
| 4,523,804 A | 6/1985 | Thompson | |
| 4,624,990 A | 11/1986 | Lunk et al. | |
| 4,705,353 A | 11/1987 | Wagoner | |
| 4,743,658 A | 5/1988 | Imbalzano et al. | |
| 4,859,836 A | 8/1989 | Lunk et al. | |
| 4,967,853 A * | 11/1990 | Landry | 175/50 |
| 5,317,061 A | 5/1994 | Chu et al. | |
| 5,473,018 A | 12/1995 | Namura et al. | |
| 5,603,999 A | 2/1997 | Namura et al. | |
| 5,677,404 A | 10/1997 | Blair | |
| 5,894,104 A | 4/1999 | Hedberg | |
| 5,932,673 A | 8/1999 | Aten et al. | |
| 6,436,533 B1 | 8/2002 | Heffner et al. | |
| 6,465,575 B1 | 10/2002 | Kusano et al. | |
| 6,649,699 B2 | 11/2003 | Namura | |
| 6,838,545 B2 | 1/2005 | Chapman et al. | |
| 7,009,113 B2 | 3/2006 | Varkey | |
| 7,030,191 B2 | 4/2006 | Namura | |
| 7,066,246 B2 | 6/2006 | Pauchet et al. | |
| 7,235,743 B2 | 6/2007 | Varkey | |
| 7,324,730 B2 | 1/2008 | Varkey et al. | |
| 2007/0102187 A1* | 5/2007 | Kundinger | 174/105 R |
| 2007/0106026 A1 | 5/2007 | Namura | |
| 2007/0106027 A1 | 5/2007 | Namura | |
| 2007/0188344 A1 | 8/2007 | Hache et al. | |
| 2009/0317553 A1 | 12/2009 | Harvey et al. | |
| 2010/0080955 A1 | 4/2010 | Harvey et al. | |
| 2010/0080959 A1 | 4/2010 | Harvey et al. | |

FOREIGN PATENT DOCUMENTS

| | | |
|---|---|---|
| JP | 61127641 | 6/1986 |
| WO | 2009/146277 A1 | 12/2009 |
| WO | 2011075351 A1 | 6/2011 |

OTHER PUBLICATIONS

Wengeler, Heinz, Authorized Officer, International Search Report for FL0517PCT, International Application No. PCT/US2011/046684, dated Dec. 2, 2011.
Scigala, R., et al, "Crystallinity of Poly(Tetrafluoroethylene)," Acta Polymerica 40, No. 1, 15-19 (1989).
Ferry, L., et al, "Study of Polytetrafluoroethylene Crystallization," Acta Polymer, 46, 300-306 (1995).
Lee, J-C, et al, "Miscibility and Cocrystallization Behavior of Two Melt-Processable Random Copolymers of Tetrafluoroethylene and Perfluoroalkylvinylether," Polymer 42 (2001) 5453-5461.
Pucciariello, R., et al, "Phase Behavior of Crystalline Blends of Poly(Tetrafluoroethylene) and of Random Fluorinated Copolymers of Tetrafluoroethylene," Journal of Polymer Science: Part B: Polymer Physics, vol. 37, 679-689 (1999), John Wiley & Sons, Inc.
Endo, M., et al, "Miscibility and Crystallization of Polytetrafluoroethylene/ Poly(Tetrafluoroethylene-Co-Perfluoropropylvinyl Ether) Blends," Macromol. Rapid Commun. 21, No. 7, 396-400, Wiley-VCH Verlag Gmbh, D-69451 Weinheim 2000.
Runt, J., et al, "Crystalline Homopolymer—Copolymer Blends: Poly(Tetrafluoroethylene)—Poly(Tetrafluoroethylene-Co-Perfluoroalkylvinyl Ether)," Macromolecules 1995, 28, 2781-2786.
Marigo, A., et al, "Annealed Samples of Some Tetrafluoroethylene Perfluorinated Copolymers Studied by Small- and Wide-Angle X-Ray Scattering and Differential Scanning Calorimetry," Macromolecules 1997, 30, 7862-7865.
Endo, M., et al, "Crystallization in Binary Blends of Polytetrafluoroethylene With Perfluorinated Tetrafluoroethylene Copolymer," Polymer Journa, vol. 36, No. 9, pp. 716-727 (2004).
Ebnesajjad, S., "Fluoroplastics, vol. 2: Melt Processible Fluoropolymers The Definitive User's Guide and Databook," Plastics Design Library, A Division of William Andrew Inc., Norwich, NY, p. 6, pp. 125-128 and PP. 133-134 (2003).

(Continued)

*Primary Examiner* — David Andrews
*Assistant Examiner* — Ronald Runyan
(74) *Attorney, Agent, or Firm* — Edwin Tocker; Keith W. Palmer

(57) ABSTRACT

Communications cable is provided for use in downhole wells wherein the cable will be exposed to a temperature of at least 280° C., the cable including as a component thereof a composition comprising melt-fabricable tetrafluoroethylene/perfluoro(alkyl vinyl ether) copolymer and melt flowable polytetrafluoroethylene, said polytetrafluoroethylene by itself having no tensile property and being present in said composition in an amount effective to enable the component to withstand this temperature, with the high temperature exposure of the cable component being effective to thermally transform the composition in the solid state, thereby obtaining epitaxial co-crystallization.

12 Claims, No Drawings

(56) References Cited

OTHER PUBLICATIONS

Klug, Harold, "X-Ray Diffraction Procedures for Polycrystalline and Amorphous Materials," John Wiley & Sons, Inc., New York, p. 491, (1954).

Lahijani, J., "Melt-Fabricable Perfluoropolymers Having Improved Heat Aging Property," FL0518USNA, Unpublished U.S. Appl. No. 13/193,676, filed Jul. 29, 2011, E. I. Du Pont De Nemours and Company.

Lahijani, J., "Improvement in Flex Life of Tetrafluoroethylene/Perfluoro(Alkyl Vinyl Ether) Copolymer (PFA)," FL0519USNA, Unpublished U.S. Appl. No. 13/193,683, filed Jul. 29, 2011, E. I. Du Pont De Nemours and Company.

* cited by examiner

DOWNHOLE WELL COMMUNICATIONS CABLE

FIELD OF INVENTION

This invention relates to communications cable in downhole wells for operation at temperatures exceeding the service temperature of fluoropolymer in components of the cable and to the use of such fluoropolymer in downhole wells under such temperature conditions.

BACKGROUND OF INVENTION

Downhole wells for the recovery of hydrocarbon fluids, such as oil and/or natural gas from the earth or for the capture of heat energy powered by aqueous fluid present in the earth are operating at higher and higher temperatures, depending where the well is drilled and how deep. With deep drilling, temperatures of at least 280° C. are not uncommon at or near the bottom of the well, i.e. proximate to the bottom of the well.

Communications cable is inserted into these downhole wells for passing signals between a control unit on the earth's surface and a downhole tool, such as a logging sensor, or to electrically power downhole operations, such as drilling. The cables include a polymeric component, e.g. either as electrical insulation or in the case of optical fiber cable as protective material surrounding the optical fiber, i.e. jacket and/or filler material positioned between the optical fiber and jacket. The downhole tool itself can include a polymeric component as sealing material to prevent intrusion of downhole fluids into the tool, insulation for electrical conductor(s) or protective material surrounding the optical fiber.

The polymeric component is the weak link in the cable insofar as ability to withstand the higher and higher temperatures encountered proximate to the bottom of the well as wells are bored deeper and deeper into the earth. U.S. Pat. No. 5,894,104 discloses a slick line cable having a logging sonde at its lower end, the cable including polymer insulations such as PFA, FEP, and TEFZEL®, and the sonde including seals of elastomer or PEEK (polyether ether ketone). PFA is tetrafluoroethylene (TFE)/perfluoro(alkyl vinyl ether) copolymer, FEP is TFE/hexafluoropropylene copolymer, and TEFZEL® is TFE/ethylene copolymer (ETFE). U.S. Pat. No. 7,235,743 discloses in FIG. 5 a wellbore cable that includes a plurality of polymer components, electrical insulation 506 surrounding a twisted strand of electrical conductors, compression-resistant filler rods 508 that may be surrounded by compression resistant polymer, armor wires 516 and 518 forming the exterior of the cable, which have a polymer coating, a jacket 514 surrounding the assemblage of insulated conductors and filler rods, and filler material 510 filling the space between insulated wires, filler rods, and jacket. PFA, FEP, and ETFE are among the polymers disclosed as being useful for many of these applications in the cable. These fluoropolymers as commonly available have the following temperature characteristics*:

|      | Melting Temp. (° C.) | Continuous Use Temp. (° C.) |
| --- | --- | --- |
| PFA  | 302-310 | 260 |
| FEP  | 245-265 | 200 |
| ETFE | 250-280 | 150 |

* pp. 6 and 125-128 and 133-134 of S. Ebnesajjad, Fluoroplastics, Vol. 2 Melt Processible Fluoropolymers, The Definitive User's Guide and Databook, published by Plastics Design Library (2003). The PFA melting temperature is for the PFA commercialized in 1972 (tetrafluoroethylene/perfluoro (propyl vinyl ether).

The melting temperature is the temperature corresponding to the position of the DSC endothermic peak resulting from the phase change of the polymer from the solid to the liquid (molten) state. The temperature that can be withstood by the polymer is far less than the melting temperature, however, as indicated by the much lower continuous use (service) temperatures. The continuous use temperatures reported above are understood to be the highest temperature at which the polymer can be used over a period of time of 6 months, during which time the tensile property falls to 50% of its original value. This temperature is determined by tensile property testing of no-load heat aged test samples of the polymer for 6 months. The test samples are removed from the heat-aging oven and are subjected to tensile property testing at ambient temperature (15-25° C.).

The reduction in tensile property with increased heat aging time denotes a deterioration of the integrity of the fluoropolymer. When the fluoropolymer is tensile-tested at the temperature of heat aging, however, the reduction in tensile property is immediate, i.e. aging is not required. For example, the tensile strength of ETFE of at least about 6000 psi (41.4 MPa) at ambient temperature falls to about 2000 psi (13.8 MPa) at 150° C. tensile testing. The concern about high temperature tensile property reduction manifests itself in the industry standard for annealing temperature for the highest melting melt processible fluoropolymer, PFA, listed in the table above. Molded articles of PFA are heated to 250-260° C. in order to relieve internal stresses to improve dimensional stability of the molded article. A typical heating time of 10 min for each 1 mm of thickness results in a heating time of about 4 hr for a thick-walled PFA molded article, i.e. 25.4 mm thick. The heating temperature is kept far below the melting temperature of the PFA to avoid collapse of the article.

PFA, having the highest continuous service temperature makes it the choice for the components of articles used in downhole wells proximate to the bottom of the well. From the experience with annealing PFA articles without causing them to become dimensionally unstable under their own weight, the continuous use temperature has become understood as being the upper limit on service temperature.

The question is whether any fluoropolymer can be used continuously at temperatures above 260° C. Polytetrafluoroethylene (PTFE) could conceivably be a candidate, because of the fact that PTFE does not flow in the molten state, due to its extremely high molecular weight. PTFE, however, has the disadvantage that it cannot be fabricated into articles by melt extrusion. This lack of melt processability is a practical barrier to the use of PTFE as the polymer component(s) of communications cable in downhole wells. Cable insulation, jacket, and protective material require melt extrusion to form their long lengths necessary in the manufacture of the long lengths of cable needed in downhole wells.

SUMMARY OF INVENTION

The present invention has discovered that PFA, which is melt processible, can be modified so as to be useful for service as components in communications cable used downhole wells wherein temperatures can be 280° C. and higher.

The invention can be defined as positioning the communications cable in a downhole well wherein the temperature can be at least 280° C., at least a portion of said cable thereby being exposed to said temperature, said cable including as a component thereof a composition comprising melt-fabricable tetrafluoroethylene/perfluoro(alkyl vinyl ether) copolymer (PFA), the perfluoroalkyl containing 1 to 5 carbon atoms, and melt flowable polytetrafluoroethylene, said polytetrafluoroethylene by itself having no tensile strength and being present in said composition in an amount effective to enable said component to withstand said temperature. The highest temperature in the well will be 280° C. or greater or is expected to be at least this temperature, and the high temperature resistance of the component of the cable that will be exposed to this temperature is planned accordingly, i.e. to withstand this temperature.

The polytetrafluoroethylene used to modify the PFA is not the PTFE discussed above as being non-melt flowable. The polytetrafluoroethylene used to modify the PFA is a low molecular weight polytetrafluoroethylene, referred to herein as LMW PTFE, as compared to the non-melt flowable PTFE that is non-melt flowable because of its extremely high molecular weight.

The ability of the component made from the composition used in the present invention to withstand a temperature of at least 280° C. means that the component maintains its melt-fabricated shape and its physical integrity during service in the downhole well. It is surprising that the polytetrafluoroethylene used in this composition, itself having no tensile strength, is able to impart higher service temperature to the PFA during the sustained high temperature exposure encountered in downhole well operation. Thus, the LMW PTFE interacts with the PFA during this high temperature service, resulting in the PFA/LMW PTFE composition resisting deterioration during the exposure to high temperature in the downhole well. This exposure results in a solid state thermal transformation within the composition, i.e. epitaxial co-crystallization, that will be further described in Example 4.

Another embodiment of the present invention can be defined as a downhole well communications cable comprising at least one electrical conductor or optical fiber surrounded by electrical insulation or protective material, respectively, said insulation or protective material comprising the composition comprising melt-fabricable tetrafluoroethylene/perfluoro(alkyl vinyl ether) copolymer, said perfluoroalkyl containing 1 to 5 carbon atoms, and melt flowable polytetrafluoroethylene, said polytetrafluoroethylene by itself having no tensile strength by itself and being present in said composition in an amount effective to enable said insulation and protective to withstand exposure to a temperature of at least 280° C. within said downhole well.

Still another embodiment can be defined as a downhole well power cable comprising (i) at least one electrical conductor, (ii) electrical insulation surrounding said conductor, and (iii) a load bearing element secured to said insulation, said insulation comprising the composition comprising melt-fabricable tetrafluoroethylene/perfluoro(alkyl vinyl ether) copolymer, said perfluoroalkyl containing 1 to 5 carbon atoms, and melt flowable polytetrafluoroethylene, said polytetrafluoroethylene by itself having no tensile strength by itself and being present in said composition in an amount effective to enable said insulation and filler to withstand exposure to a temperature of at least 280° C. within said downhole well. The insulation can be primary and/or secondary insulation. The conductor of the power cable is typically formed from twisted together wires forming interstices at the surface of the conductor, and the insulation surrounding the conductor fills these interstices.

The present invention can also be described as the use of the composition comprising melt-fabricable tetrafluoroethylene/perfluoro(alkyl-vinyl ether) copolymer, said perfluoroalkyl containing 1 to 5 carbon atoms, and melt flowable polytetrafluoroethylene in a downhole well wherein the temperature to which said composition can be exposed is 280° C. or greater. The polytetrafluoroethylene in this composition as described above has no tensile strength by itself and is present in said composition in an amount effective to enable said composition to withstand exposure to the temperature of at least 280° C. It is contemplated that the principal application (use) of the composition will be as a component of communications cable as described herein.

DETAILED DESCRIPTION OF INVENTION

The downhole wells to which the present invention is applicable will generally be those that produce hydrocarbon fluid such as oil and/or natural gas or thermal energy. The downhole well can also be that which produces a different fluid, one that is non-hydrocarbon fluid, especially steam, as in the case of geothermal wells. In these downhole wells, the fluid is recovered from the earth. Another downhole well is that which is used for recovery of fluid for the earth, but indirectly so, as in the case of pumping steam into the well for liquefying oil in oil sands, the liquefied oil then being recovered by conveyance through and injection from a separate, adjacent downhole well. The top of the well, i.e. the well head, can be located on land or under the sea at the sea floor. The downhole well can be as drilled, i.e. the well bore, or can be encased to contain a production tube for recovery of the fluid from the earth to the well head or supply of steam to the well bottom, as the case may be. The production tube contains an opening at the well bottom (well end) for receiving the fluid from the earth or injecting steam into the earth and an opening at the top (well head) for discharge of the conveyed fluid and for receiving the injection steam. The production tube generally extends the length of the well bore proximate to the well end. An additional tube may be fixed by the encasement of the production tube within the well to be adjacent to the production tube. This additional tube, sometimes called a capillary, provides a passage for positioning of communications cable when such cable is not positioned within the production tube The bottom of the down hole well is the lower end of the well bore. This lower end is the deepest part of the well. The bottom of the well can be the deepest vertical well penetration into the earth and also includes any horizontal portion extending from this vertical penetration. The horizontally extended portion of the well bore is not necessarily at right angles to the vertical well bore or parallel to the earth surface. This extended portion follows the earth stratum, which is generally horizontal, from which the desired fluid is to be extracted.

Generally, the bottom of the well is the hottest zone of the well, and in the case of horizontally extending well bore, this hottest zone has considerable length. The portion of the communications cable positioned proximate to the well bottom is exposed to the temperature of this hottest zone. Supplementing the heat from the earth may be heat generated by the downhole operation, such as drilling, which can raise the well temperature by 30-50° C. Thus the 280° C. plus temperature encountered within the down hole well can be the result of both earth temperature and operations-generated (input) temperature. Another input temperature arises from steam injection into the well. While the hottest zone of the well will generally be proximate to the bottom of the well, including at the bottom (end) of the well, this zone can be much longer, i.e. occupy a greater length of the well, in the case of the well being used for steam injection. Communications cable is generally made for withstanding the hottest temperature zone in the well, even though only a portion of the length of the cable may be exposed to this zone. This is because the cable is made generally by a continuous process, by extrusion formation of the polymeric component, e.g. as electrical insulation, the cable is formed.

While the components of cable of the present invention qualify for exposure to temperatures of at least 280° C. in the well, these components also qualify for use at higher well temperatures, e.g. at least 290° C. and preferably at least 300° C. These temperatures exist proximate to the deepest part (bottom) of the well, which is generally where the lower end of the production tube, when present, for the well is positioned. The period of exposure of the component to the highest temperature in the well will vary in accordance with the residence time needed for the communications cable inserted into the downhole well. These components also qualify for sustained use at each of these well temperatures, the minimum period of sustained use being at least one week, preferably at least one month, and more preferably at least six months. These minimum periods of sustained use apply to each of the minimum downhole well temperatures mentioned above.

The composition used in the present invention can form cable components in a wide variety of cable designs, wherein the cable has at least a portion thereof positioned proximate to the hottest zone of the well such as the bottom of the well. These components are those that can be made from polymer material. More than one component of the cable can be made of the composition, whereby description of the component as of the cable as being made of the composition may be expressed in terms of "includes" to denote the possibility of a plurality of components being made of the composition. Some particulars of these designs are discussed below with reference to drawings in patents or published patent applications. These drawings and their accompanying disclosures are incorporated herein by reference.

One group of communications cable for use in the downhole well is communications cable communicating a signal (data) between proximate to said bottom of the well, e.g. the bottom of the production tube and the top of the well, such cable comprising at least one electrical conductor and insulation surrounding the conductor, and the component made of composition used in the present invention is or includes the insulation.

The term "insulation" used in this patent application is electrical insulation, i.e. insulation that does not conduct electricity. The insulation can be primary insulation or secondary insulation. Primary insulation is the insulation surrounding the electrical conductor and being in contact with the conductor along its length. Secondary insulation is additional insulation surrounding the conductor, but being applied to the primary insulation, either directly onto the primary insulation or indirectly as in the case when an intervening filler insulation is present. Thus, the secondary insulation will typically be either a jacket for the primary-insulated conductor or the jacket for filling material surrounding primary-insulated conductor. The composition used in the present invention can be used in both secondary insulation applications. The term "conductor" used in this patent application is meant electrical conductor, whether made of a single wire or multiple wires, usually twisted together to form a strand.

Another group of communications cable for use in the downhole well comprises at least one optical fiber and protective material surrounding the optical fiber, wherein the component made from composition used in the present invention is or includes the protective material surrounding the optical fiber.

Another group of communications cable for use in the downhole well is communications cable having a lower end, comprising a sensor such as for well logging positioned at the lower end, the sensor comprising either at least one electrical conductor or at least one optical fiber and a housing for protecting said electrical conductor or optical fiber, the component made from composition used in the present invention is or includes a seal isolating the interior of said housing from said downhole well. This prevents fluid from the well, which is both corrosive and at high temperature from entering the housing to corrode the sensor. Another equipment that may be positioned at the lower end of the cable can be a motor having a winding, and the component of the cable made from the composition is or includes the insulation for the motor winding.

Another group of communications cable for use in downhole wells is power cable providing electrical power to the bottom of the well, wherein the component made from composition used in the present invention is or includes insulation. Rather than communicating data, this cable communicates (transmits) electrical power to equipment to which the cable is attached. The insulation can be primary and/or secondary insulation for the conductor of the cable.

The communications cable will generally include a load-bearing element, i.e. an element other than the electrical conductor or optical fiber that is an integral part of the cable so as to carry the load of the cable down the length of the downhole well. Such communications cable can be used for communicating information from the depths of the well to the well head or providing power to a downhole operation such as drilling. Typically, the load bearing element will comprise high strength wires positioned at the exterior of the cable and forming an integral part of the cable. The communications cable can also comprise metal sheathing over the composition as protection against the handling and application environment within which the communications cable is used.

Examples of such components of communications cable that can be made of composition used in the present invention are as follows:

U.S. Pat. No. 3,832,481 shows in FIG. 4 the cross-section of an electric cable for powering submersible motors, the cable consisting of three twisted wire strands 17, forming three electrical conductors, each conductor being coated with primary insulation 19, jacket 21, and with the assemblage of the three insulated conductors being encased in a filling material 23, followed by a jacket 13 and outer metal armor 15. One or more of the components of this cable i.e. primary insulation 19, jacket 21, filling material 23, and jacket 13 can be made of the composition used in the present invention. The twisted wire strands forming the conductor also form interstices at the surface of said conductor as shown in FIG. 4, and the primary insulation 19 also serves as filling material, i.e. filling these interstices as well as the space between the conductor and the jacket that envelops the conductor and primary insulation.

U.S. Pat. No. 4,705,353 shows in FIG. 1 the cross-section of a optical fiber cable, wherein each optical fiber 12 is encased in a protective layer 16 of TEFLON® fluoropolymer, and the assemblage of three encased optical fibers are encased in a protective jacket 18 of TEFZEL® fluoropolymer resin. The protective layer 16 and/or the protective jacket 18 can be made of composition of the present invention.

U.S. Pat. No. 4,523,804 shows in FIG. 1 the cross-section of an optical fiber cable wherein an outer jacket 20 of polymeric material such as PFA is provided over the intermediate protective materials for the optical fibers 14. This jacket can be made of composition used in the present invention.

U.S. Pat. No. 5,894,104 shows in FIG. 2 a side view of a cable comprising a slick line conductor 20 for transmitting data, insulation 21 surrounding the conductor, and a metal tube 22 surrounding the insulation 21, all encapsulated within a housing 23 forming a sensor. The insulation can be made of composition used in the present invention. FIG. 4 shows in cross-section the presence of blocking dams 30 and insert 35 positioned between insulated conductor and housing for isolating the interior of the housing 23 from the well, i.e. preventing the entry of fluid from the well into the interior of the housing. The dams and/or insert can be made of composition used in the present invention. FIG. 4 also shows a layer of high temperature polymer insulation 21 encasing the conductor 21 within the sensor housing, which can also be made of composition of the present invention.

U.S. Pat. No. 7,009,113 shows in FIG. 3 the cross-section of an electric cable consisting of conductors 202 and 204 formed from twisted wires, each conductor being surrounded by primary insulation 206, jacket 207, filling material 208, and an outer jacket 302, with at least two layers 214 and 216 of armor wires forming outer protection for the cable and carrying the load of the cable. One or more of the following components can be made from composition used in the present invention: primary insulation 206, jacket 207, filling material 208, and outer jacket 302.

U.S. Pat. No. 7,066,246 shows in FIG. 2 the cross-section of a flat cable comprising an array of conductors 202 for transmitting signals, each conductor being surrounded by primary insulation 204, with the array of insulated conductors being bonded to a flat elongated (in the length direction of the cable) support layer 206 of filled plastic. The primary insulation 204 can be made from composition used in the present invention.

U.S. Pat. No. 7,235,743 shows in FIG. 5 the cross-section of an electric cable comprising a plurality of conductors 504, each having polymer insulation 506, all encased in a creep-resistant jacket 514 and armor wires 516 and 518. The space between the insulated conductors and jacket 514 is filled with non-compressible filler material 510 and interdispersed compression-resistant filler rods 508, each of which is polymer coated yarn. One of more of the following cable components can be made of composition used in the present invention: polymer insulation 506, filler material 510, and polymer coating forming the filler rods 508.

U.S. Pat. No. 7,324,730 shows in FIG. 2 the cross-section of a fiber optic/electric conductor cable wherein polymeric insulating material 108 encases the bundle of twisted-together conductors 106 and fills the interstices formed by the twisting of the conductors together. FIG. 3 shows in cross-section a centrally positioned optical fiber 302 surrounded by metallic conductors 304, which are in turn surrounded by polymeric insulating material 306, which can be made of composition used in the present invention.

US 2007/0188344 shows in FIG. 7 an encased wellbore containing a drill string 12 forming a hollow tube and having a drill head 15 at its lower end. Conductor 708 having sensor 710 at its lower end is passed down the hollow interior of the drill string 12 until the sensor 710 is adjacent to the drill head. The sensor serves as a logging-while-drilling tool and/or measuring-while-drilling tool in providing information to the well surface. The insulation of the conductor 708 and within the sensor are components that can be made of the composition used in the present invention.

These applications of the composition used in the present invention as components in communications cable are merely illustrative of such applications, not a limitation on the use of this composition in downhole well cables. It is contemplated that the higher downhole well service temperature imparted to the cable by use of this composition will lead to new cable designs, including sensor designs, in which the composition can be used as one or more components thereof.

With respect to the polymer ingredients used to make the composition used in the present invention and making up the polymer component of the articles described above, the PFA is a copolymer of tetrafluoroethylene (TFE) and perfluoro (alkyl vinyl ether) (PAVE) in which the linear or branched perfluoroalkyl group contains 1 to 5 carbon atoms. Preferred PAVE monomers are those in which the perfluoroalkyl group contains 1, 2, 3 or 4 carbon atoms, respectively known as perfluoro(methyl vinyl ether) (PMVE), perfluoro(ethyl vinyl ether) (PEVE), perfluoro(propyl vinyl ether) (PPVE), and perfluoro(butyl vinyl ether) (PBVE). The copolymer can be made using several PAVE monomers, such as the TFE/perfluoro(methyl vinyl ether)/perfluoro(propyl vinyl ether) copolymer, sometimes called MFA by the manufacturer, but included as PFA herein. The PFA may contain about 1-15 wt % PAVE, although for a PAVE content of 2 to 5 wt %, preferably 3.0 to 4.8 wt %, is the most common PAVE content when a single PAVE monomer is used to form the PFA, the TFE forming the remainder of the copolymer. When PAVE includes PMVE, the composition is about 0.5 to 13 wt % perfluoro(methyl vinyl ether) and about 0.5 to 3 wt % PPVE, the remainder to total 100 wt % being TFE. Preferably, the identity and amount of PAVE present in the PFA is such that the melting temperature of the PFA is greater than 300° C. The PFA is a fluoroplastic, not a fluoroelastomer. As a fluoroplastic, the PFA is semicrystalline, i.e. partially crystalline.

The PFA is in addition to being melt processable is also melt fabricable, i.e. the PFA is sufficiently flowable in the molten state that it can be fabricated by melt processing such as extrusion, to produce products having sufficient strength so as to be useful. This sufficient strength may be characterized by the PFA by itself exhibiting an MIT Flex Life of at least 1000 cycles, preferably at least 2000 cycles using 8 mil (0.21 mm) thick film. In the MIT Flex Life test, the film is gripped between jaws and is flexed back and forth over a 135° range. In this case, the strength of the PFA is indicated by it not being brittle. The melt flow rate (MFR) of the PFA (prior to any heat treatment) is preferably at least 0.1 g/10 min, preferably at least 5 g/10 min, and even more preferably at least 7 g/10 min, as measured according to ASTM D-1238 and ASTM D 3307-93, at 372° C. using a 5 kg weight on the molten PFA.

The PFA can be fluorine-treated so as to have the stable —$CF_3$ end group as the predominate end group and less than 50, preferably less than 25, unstable total end groups, especially, —$CONH_2$, —COF, —$CH_2OH$ and —COOH per $10^6$ carbon atoms as the most common end groups resulting from the aqueous dispersion polymerization process used to make the PFA. Processes for fluorination disclosed in U.S. Pat. No. 4,743,658 (Imbalzano and Kerbow) and U.S. Pat. No. 6,838,545 (Chapman and Bidstrup). According to one aspect of the present invention, the PFA is not fluorine treated, whereby its end groups are the unstable end groups mentioned above arising from aqueous dispersion polymerization to form the PFA.

With respect to the polytetrafluoroethylene used in the present invention, it is understood by one skilled in the art that when PTFE is disclosed in the literature without any qualifying language, that PTFE is the non-melt flowable PTFE, this non-melt flowability arising from the extremely high molecular weight of this polymer. The polytetrafluoroethylene used in the present invention is melt flowable because of the low molecular weight of this polymer, and is referred to hereinafter as LMW PTFE. While this low molecular weight imparts melt flowability to the polymer, the LMW PTFE is not melt fabricable. By not melt fabricable is meant, an article molded from the LMW PTFE melt is useless, by virtue of extreme brittleness. Because of its low molecular weight (relative to non-melt-flowable PTFE), the LMW PTFE has no strength. An extruded filament of this low molecular weight PTFE is so brittle that it breaks upon flexing. Generally, compression molded plaques cannot be made for tensile testing of the low molecular weight polytetrafluorethylene used in the present invention. The plaques will crack or crumble when removed from the compression mold, whereby neither the tensile property nor MIT Flex Life can be tested. In effect this polymer has no (0) tensile strength and an MIT Flex Life of zero cycles.

The LMW PTFE can also be characterized by high crystallinity, preferably exhibiting a heat of crystallization of at least 50 J/g.

In addition to the LMW PTFE being characterized by its high crystallinity and lack of strength, the preferred LMW PTFE has melt flowability, i.e. the LMW PTFE flows in the molten state. One measure of this melt flowability is melt flow rate (MFR) through an orifice at a given temperature and under a given load on the molten polymer using equipment such as the plastometer described in ASTM D 1238. A preferred LMW PTFE has an MFR of at least 0.01 g/10 min, preferably at least 1 g/10 min, more preferably at least 5 g/10 min, as measured in accordance with ASTM D 1238, at 372° C. using a 5 kg weight on the molten polymer. LMW PTFE is obtained by either direct polymerization under conditions that prevent very long polymer chains from forming, or by irradiation degradation of PTFE, i.e. the high molecular weight, non-melt flowable PTFE. While the LMW PTFE has low molecular weight, it nevertheless has sufficient molecular weight to be solid up to high temperatures, e.g. to have a melting temperature of at least 300° C., more preferably at least 310° C., even more preferably, at least 320° C. One indicator of this sufficient molecular weight is that the LMW PTFE forms a viscous melt, such that when the polymer is subjected to the MFR determination in accordance with ASTM D 1238 at 372° C., using a 5 kg weight, the MFR of the polymer is no greater than 100 g/10 min, preferably no greater than 75 g/10 min, even more preferably, no greater than 50 g/10 min. Each of these highest MFR amounts can be combined with any of the lowest MFR amounts mentioned above to form MFR ranges, e.g. 0.01-50 g/10 min, 0.01 to 75 g/10 min, 5 to 100 g/10 min, etc. The MFR of the PFA and the LMW PTFE used in the compositions is preferably within the range of 20 g/10 min from each other, more preferably within the range of 15 g/10 min from each other, and more preferably within the range of 10 g/10 min from each other. The melt flow rates disclosed herein are determined on polymer that has not been subjected to heat aging, i.e. sustained exposure to high temperatures such as encountered in a downhole well as described above.

The LMW PTFE used in the present invention is frequently called PTFE micropowder, which is also another way of distinguishing this polymer from the high molecular weight, non-melt flowable PTFE. The trademark TEFLON® of the DuPont Company is well known as being applicable to PTFE. In contrast, the DuPont Company sells the PTFE micropowder as ZONYL® fluoroadditive to be used for imparting low surface energy and other fluoropolymer attributes when added to other materials.

The proportions of PFA and LMW PTFE used to make cable components for downhole well application are generally a large amount of the LMW PTFE in order to provide the increased temperature resistance to the component so that it can operate at a considerably greater downhole temperature than the component made solely from PFA for the period of time required by the well operation. In this regard, the component should contain at least 12 wt % of the LMW PTFE, preferably, at least 15 wt %. To withstand 300° C. in the downhole well, the minimum amount of LMW PTFE is at least 18 wt %, preferably at least 20 wt %. The maximum LMW PTFE content will be dictated by the particular application of the component, and in any event should be less than 50 wt %. For all the LMW PTFE minimum contents mentioned above, the preferred maximum amount of LMW PTFE in the composition forming the component is 45 wt %, thereby defining LMW PTFE content ranges of 12- to 45 wt %, 15 to 45 wt %, 18 to 45 wt % and 20 to 45 wt %. On the same basis, the preferred maximum amount of LMW PTFE is 40 wt % and more preferably, 35 wt %, and even more preferably 30 wt %. Thus, additional LMW PTFE content ranges can be 18 to 40 wt %, 18 to 35 wt % and 18 to 30 wt %, 20 to 45 wt %, 20 to 35 wt %, and 20 to 30 wt %. For all these wt % amounts, the PFA constitutes the remaining polymer content to total 100 wt % based on the combined weight of these polymers. Preferably, a single LMW PTFE and a single PFA is used to form the composition from which the component is made, and these are the only polymer ingredients making up the composition. Pigment may be present in the composition, but preferably one that does not render the composition electrically conductive. The composition is preferably non-electrically conductive, in which case it will be free of electrically conductive carbon. Preferably the dielectric constant of the composition is no greater than 2.4, more preferably, no greater than 2.2 (determined at 20° C.), enabling the composition and the component made therefrom to be electrically insulating, i.e. electrically non-conductive.

The composition from which the components are made is preferably prepared by thorough melt mixing of the PFA and LMW PTFE together in the proportions desired. Melt-mixing as disclosed herein and as the term implies is the heating of the composition above the melting temperature of both components, and subjecting the resultant melt to mixing, such as by stirring the melt, as occurs using the injection or extrusion screw present in injection molding or extrusion, respectively. The shear rate used for the melt mixing will generally be at least about 75 s$^{-1}$.

Prior to melt mixing, the two polymers can be dry blended to form the composition as a dry blended mixture. The form of the polymers for dry blending can be extruded pellets of the PFA and LMW PTFE powder. Typically the pellets will be smaller than 10 mm in diameter and length, and the LMW PTFE powder will have an average particle size less than 50 micrometers as measured by laser Microtac® equipment.

Upon cooling the molten composition from the melt fabrication process, the PFA and LMW PTFE will crystallize separately as indicated by the composition exhibiting two melting temperatures corresponding approximately to the melting temperatures of the two polymer components of the composition. The heat treatment of the composition occurring by long residence time at the highest temperature of the well causes a solid state thermal transformation, i.e. epitaxial co-crystallization, whereby the composition now exhibits only a single melting temperature. The resultant melt-mixed composition is nevertheless referred to herein as comprising both polymer components in the belief that at the molecular level, these two components are still present in the composition even after the thermal transformation caused by heat aging. The term "comprising" used herein includes the description of the composition as to how it is made, i.e. the composition being made by melt mixing of the two polymer components (and melt fabrication) and the composition that is heat aged to bring about epitaxial co-crystallization. The reference to composition undergoing epitaxial co-crystallization also applies to cable components made from the composition such as by melt fabrication.

The melt mixture of the composition can be melt-fabricated into the final form of the cable component or into extruded pellets of the composition, which can then be melt-fabricated into the final form of the component desired. The melt fabrication process will depend on the component being formed, but will generally use such melt fabrication processes as extrusion, injection molding, transfer molding, compression molding, rotolining or rotomolding.

The ability of the composition to withstand the high temperature of the downhole well, e.g. at least 280° C., can be quantified as the composition retaining at least 80% of its original (unaged) tensile modulus, and more preferably at least 90%, all determined at ambient temperature (15-25° C.) testing unless otherwise indicated. Preferably this modulus retention is also achieved at higher temperatures of exposure, e.g. at least 290° C. or 300° C., and even more preferably at least 310° C. The original tensile modulus is the tensile modulus prior to exposure to this high temperature. The time period of the exposure will generally be lengthy, e.g. for at least I week, often at least 2 weeks, and preferably for at least 6 months at the 280° C. temperature or higher temperatures such as 290° C. or 300° C. Most preferably, the tensile modulus remains at least as high as the original tensile modulus after each of these these exposure conditions. The time periods of exposure to high temperature disclosed herein, can be the result of continuous or discontinuous exposure. In the case of continuous exposure, the exposure is uninterrupted. In the case of discontinuous exposure, the exposure is interrupted, as may occur when the cable component is used in the depths of a downhole well and is periodically removed and re-installed in the well. Thus, this time of exposure to the high temperature is a cumulative time of exposure.

EXAMPLES

The tensile (Young's) modulus is determined by the procedure of ASTM D 638-03 as modified by ASTM D3307 section 9.6 on dumbbell-shaped test specimens 15 mm wide by 38 mm long and having a thickness of 5 mm, stamped out from 60 mil (1.5 mm) thick compression molded plaques. Tensile moduli disclosed herein are determined at 23° C. unless otherwise indicated.

The procedure for measuring MIT Flex Life is disclosed at ASTM D 2176 using a 8 mil (0.21 mm) thick compression molded film.

The compression molding of the plaques and film used in these tests was carried out on melt-blended compositions made in the Brabender® extruder as described later herein under a force of 20,000 lbs (9070 kg) at a temperature of 343° C. to make 7×7 in (17.8×17.8 cm) compression moldings. In greater detail, to make the 60 mil (1.5 mm) thick plaque, 80 g of the composition is added to a chase which is 63 mil (1.6 mm) thick. The chase defines the 17.8×17.8 cm plaque size. To avoid sticking to the platens of the compression molding press, the chase and composition filling are sandwiched between two sheets of aluminum. The combination of the chase and the aluminum sheets (backed up by the platens of the press) form the mold. The press platens are heated to 343° C. The total press time is 10 min, with the first one minute being used to gradually reach the press force of 20,000 lb (9070 kg) and the last minute being used for pressure release. The sandwich is then immediately transferred to a 70-ton (63560 kg) cold press, and 20,000 lb (9070 kg) force is applied to the hot compression molding for 5 min. The sandwich is then removed from the cold press and the compression molded plaque is removed from the mold. The dumbbell test specimens (samples) are die cut from the plaque using the steel die described in FIG. 1 of ASTM D 3307. The film used in the MIT test used the same procedure except that the chase is 8 mil (0.21 mm) thick and the amount of composition added to the mold is 11.25 g. The film samples used in the MIT test were ½ in (1.27 cm) wide strips cut from the compression molded film. The composition from which the plaques or film are made is preferably composition prior to the making of the cable rather than from the component itself, since the latter would involve destruction of the component The LMW PTFE used in the Examples are as follows:
LMW PTFE A has a heat of crystallization of 64 J/g, melting temperature of 325° C. (second heat) and average particle size of 12 micrometers, and MFR of 17.9 g/10 min.
LMW PTFE B has a heat of crystallization of 59 J/g, melting temperature of 330° C. (second heat), average particle size of 20 micrometers and MFR of 0.01 g/10 min.
Neither of these LMW PTFEs could be compression molded into plaques that had sufficient integrity for tensile property testing.

The PFAs used in the Examples are as follows:
PFA 1 is a TFE/PPVE copolymer having an MFR of 14 g/10 min.
PFA 2 is a TFE/PPVE copolymer having an MFR of 2 g/10 min.
PFA 3 is a TFE/PPVE copolymer having an MFR of 5.2 g/10 min.
PFA 4 is fluorine treated PFA 1 and has no more than 20 unstable end groups (—COF and —COOH) per $10^6$ carbon atoms in the polymer chain. All of these PFAs have a melting temperature (first heat) of 307 to 308° C. and contain 3.2 to 4.8 wt % PPVE. PFA 1, PFA 2, and PFA 3 are not fluorine treated and the end group population of these PFAs is mainly —COOH and a small proportion of —COF. The PFAs are in the form of pellets obtained by melt extrusion and cutting of the extruded strand into the pellets.

The procedure for determining melting temperatures disclosed herein is by DSC (differential scanning calorimeter) analysis in accordance with ASTM D3418-08. The calorimeter used is TA Instruments (New Castle, Del., USA) Q1000 model. The temperature scale has been calibrated using (a) 3 metal melting onsets: mercury (−38.86° C.), indium (156.61° C.), tin (231.93° C.) and (b) the 10°/min heating rate and 30 ml/min dry nitrogen flow rate. The calorimetric scale has been calibrated using the heat of fusion of indium (28.42 J/g) and the (b) conditions. The melting temperature determinations are carried out using the (b) conditions. The melting temperatures disclosed herein are the endothermic peak of the curve obtained from DSC. The peak obtained from the first heating up to 350° C. is the first heat melting temperature. This is followed by cool down and a second heating to 350° C. to obtain a second heat melting temperature. Details of the heating and cooling cycles are disclosed in U.S. Pat. No. 5,603, 999, except that the highest temperature used is 350° C. instead of 380° C. The melting temperatures of the PFA/LMW PTFE compositions disclosed herein are first heat melting temperatures.

Heat of crystallization (first heat) is determined as disclosed in U.S. Pat. No. 5,603,999.

The blends (melt mixtures) of PFA and LMW PTFE used in the Examples are obtained by the following procedure: A Brabender® single screw extruder is used. The extruder is equipped with a 1¼ in (3.2 cm) diameter screw having a Saxton-type mixing tip and the extruder has an L/D ratio of 20:1. Pellets of the PFA and LMW PTFE powder are dry blended, followed by melt mixing in the Brabender® extruder. For the 30 wt % LMW PTFE content composition, the blending is in three steps. In the first step, one-third of the desired total amount of the LMW PTFE is mixed with the PFA pellets and then passed through the extruder, which extrudes pellets of this mixture. In the second step, these pellets are dry mixed with another one third of the desired total amount of LMW PTFE and passed through the Brabender extruder to produce extruded pellets. The third step is dry blending of these pellets with the final one third of the LMW PTFE and then passing this composition through the extruder to obtain well-mixed PFA/LMW PTFE blend in the form of pellets. For the 20 wt % LMW PTFE/PFA composition, only the first two passes through the extruder are carried out. The temperature profile in the extruder is as follows: zone 1=315° C., zone 2=321° C., zone 3=332° C., zone 4=338° C., zone 5 and die=349° C. The extruder screw is operated at 120 rpm.

Example 1

Compositions Withstanding 315° C.

The Example shows PFA/LMW PTFE compositions withstanding exposure at a temperature much greater than the 260° C. continuous use temperature of the PFA for long periods of time, by the composition retaining its original tensile modulus. The compositions increase in tensile modulus with increasing exposure time. Table 1 reports the results wherein test samples of the melt-mixed blends of PFA with LMW PTFE are exposed to no-load heating at 315° C., in a circulating air oven. This temperature is used to qualify the compositions and components made therefrom for continuous service in downhole wells wherein temperatures as high as 300° C. can be encountered.

TABLE 1

| | Tensile Modulus-MPa | | | | |
|---|---|---|---|---|---|
| Weeks | PFA 2/B-20 | PFA 2/A-20 | PFA 3/A-20 | PFA 4/A-20 | PFA 1/A-30 |
| 0 | 487 | 465 | 484 | 487 | 541 |
| 3 | 477 | 485 | 469 | 469 | 508 |
| 6 | 500 | 518 | 566 | 503 | 551 |
| 9 | 497 | 520 | 494 | 497 | 591 |
| 12 | 502 | 529 | 528 | 542 | 602 |

In Table 1, the "Weeks" column represents the period of time of exposure of the tensile modulus test specimens at 315° C. In the column heading "PFA 2/B-20", B is 20 wt % LMW PTFE B in the composition. The remaining column headings are to be similarly interpreted, e.g. "A-30" is 30 wt % LMW PTFE A. Test specimens are removed from the oven each week and tested for tensile modulus. For brevity, only the results for three week intervals are reported in Table 1. Each test specimen is tested for tensile modulus only once and then is discarded, whereby each tensile modulus test result is on a new test specimen. The testing for tensile modulus is done at 23° C.

The tensile modulus test results shown in Table 1 reveal that the trend for tensile modulus is to increase with increasing time of heating in weeks. The omitted tensile test results for weeks 1, 2, 4, 5, 7, 8, 10, and 11 agree with this trend. This is contrary to the expectation of diminishing tensile property with heating time leading to the establishment of 260° C. as the continuous use temperature for PFA by itself. Surprisingly the presence of the substantial amount of LMW PTFE in the PFA composition provides this improvement.

Tensile modulus testing of the composition PFA1/LMW PTFE A-20 after aging for long periods of time reveals a similar retention of tensile modulus, wherein the trend is increasing tensile modulus with increased time of heating at 315° C. as shown in the following Table:

TABLE 2

| Weeks | Tensile Modulus - MPa |
|---|---|
| 0 | 487 |
| 5 | 479 |
| 10 | 507 |
| 15 | 535 |
| 20 | 576 |

The omitted tensile test results for weeks 1-4, 6-9, 11-14, and 16-19 and 11 agree with this trend of (a) retention of tensile modulus and (b) increase in tensile modulus with increasing heating time. The retention of tensile modulus has been observed with heating at 315° C. for 6 months and longer. For example, the tensile modulus tested at 23° C. remains within 90% of the original tensile modulus after 18 months of heat aging at 315° C. The same is true for the composition PFA 3/A-20

When the LMW PTFE concentration in the PFA is reduced to 15 wt % under this heating condition, the test specimens become unsuitable for testing due to distortion while being heated in the oven for just one week. This means that the heating temperature must be reduced, e.g. to 300° C., to obtain a service temperature suitability of about 285° C.

All of the PFA/LMW PTFE compositions used in these Examples exhibit a single melt temperature (second heat) within the range 318° C. to 324° C. after heat aging and a dielectric constant of less than 2.2.

Example 2

Tensile Testing at Elevated Temperatures

While tensile testing at ambient temperature is relied upon for determining continuous use temperature, it is also desirable to know the tensile property at a high temperature.

When the PFA/LMW PTFE composition is subjected to heat aging at 315° C. for 7 days and tensile tested at 250° C., the composition still exhibits significant tensile modulus as shown in Table 3.

TABLE 3

| Test Temp. - ° C. | Tensile Modulus (MPa) PFA 1/A-20 |
|---|---|
| 23 | 540 |
| 250 | 25 |

When the heating of the PFA 1/A-20 composition is done at 315° C. and tested for tensile modulus at 200° C., the results reported in Table 4 are obtained.

TABLE 4

| Heat aging time (hr) | Tensile Modulus-(MPa) |
|---|---|
| 0 | 50 |
| 24 | 55.8 |
| 48 | 56 |
| 168 | 56 |

Example 3

Applications of the PFA/LMW PTFE Compositions in Downhole Well Communications Cable Examples of components in downhole well communications cable that can be made of the compositions are described above with reference to the patents mentioned. These components can be made in the manufacture of the cable by the same melt fabrication process used to form the cable components from the polymer indicated in the patents. Generally, in the case of insulation, either primary or secondary, the component will be formed by extrusion onto the cable construction already formed. For example, cable jacket is extruded onto primary insulated conductor, the primary insulation having been previously formed by extrusion onto the conductor. The same is true for fiber optic cable. The composition is extruded onto the fiber optic to serve as protective material for the optical fiber, whether this protective material is the cable jacket and/or filler material between the optical fiber and the cable jacket.

Example 4

Epitaxial Co-Crystallization

During the exposure of the portion of the communications cable that is exposed to the highest temperature of the downhole well, that portion undergoes a crystallographic transformation from a blend of separate crystals primarily of PFA and LMW PTFE to co-crystals of these polymer components. This transformation, called epitaxial co-crystallization (ECC), is a solid state reaction occurring during the heat aging caused by the prolonged exposure of that portion of the communications cable to the downhole well high temperature. The manifestation of ECC is that the heat aged portion of the cable composition exhibits a single DSC melting temperature (first heat). In contrast, the same portion of the communications cable prior to heat aging and although having been melt-fabricated into the portion of the communications cable exhibits two melting temperatures corresponding approximately to the melting temperature of each polymer component.

ECC is the phenomenon in these separate crystals becoming co-crystals such that the DSC first heat melting temperature is a single melting temperature, which is greater than the melting temperature of the PFA, and indicating that the crystals of PFA and LMW PTFE have transformed to a different crystalline state, namely co-crystals.

ECC occurs in the present invention by the downhole well heat aging at a temperature at which the PFA/LMW PTFE composition retains its melt fabricated shape and, i.e. the composition and the cable component made therefrom is in the solid state. The shape of the melt-fabricated article is discernible after heat aging. This is important to retain the shape of the melt-fabricated portion of the communications cable. Thus, while the heat aging temperature is high, such temperature is not so high that the cable portion melts and flows to lose its original (unaged) shape. It has been found that this shape stability is retained even with heat aging at temperatures greater than the melting temperature of the PFA by itself. It is preferred, however, that the heat aging temperature (maximum temperature of exposure in the downhole well) be less than the melting temperature of the lowest melting temperature component of the composition, i.e. less than the melting temperature of the PFA.

Melt fabrication of the PFA/LMW PTFE composition does not produce ECC. By this is meant the melt-fabricated composition (cable portion exposed to downhole well high temperature) exhibits two melting temperatures corresponding approximately to that of the PFA and LMW PTFE components as shown by the following testing. The composition tested is 75 wt % PFA3 and 25 wt % LMW PTFE A. The starting material is this composition in the form of pellets prepared using the Brabender® single screw extruder as described above.

DSC analysis of the pellets reveals the presence of two endothermic peaks (melting temperature) at approximately 315° C. and 322° C., indicating the presence of separate crystals of the PFA and LMW PTFE in the melt-fabricated pellets of the composition.

Re-extrusion of the pellets through a Kombiplast® extruder having a screw design for thorough melt blending of the components of the composition and DSC analysis of the extrudate reveals approximately the same two melting temperatures (312° C. and 320° C.) for the unaged composition.

Heat aging of the extrudate for 1 day at 300° C. followed by DSC analysis reveals a single melting temperature for the composition, 319° C. It has been determined that at least about 12 hr heat aging at 300° C. is required before an essentially single melting temperature is exhibited by the composition.

The re-extrusion of the unaged composition is repeated 6 times and the resultant unaged extrudate for each extrusion is subjected to DSC analysis, the result being the presence of two melting peaks within the range of 313° C.-314° C. and 321° C.-322° C.

Heat aging at 300° C. for 1 day of the unaged extrudate from each of these 6 re-extrusions reveals a single DSC melting peak (melting temperature) within the range of 318° C. to 319° C.

The extrudate remains solid and the shape of the extrudate remains discernible even after this heat aging i.e. this heat aging is carried out with the extrudate being in the solid state.

Thus, it is apparent that that heat aging in the downhole well is required for ECC to occur.

The invention claimed is:

1. In a downhole well wherein the temperature is 290° C. or greater, a communications cable positioned within said well, at least a portion of said cable thereby being exposed to said temperature, said cable including as a component thereof a composition consisting essentially of 65 to 85 wt % melt-fabricable tetrafluoroethylene/perfluoro(alkyl vinyl ether) copolymer, said perfluoroalkyl containing 1 to 5 carbon atoms, and 15 to 35 wt % melt flowable polytetrafluoroethylene, to total 100 wt % based on the combined weight of said tetrafluoroethylene/perfluoro(alkyl vinyl ether) copolymer and said polytetrafluoroethylene, wherein the melt flow rate of said tetrafluoroethylene/perfluoro(alkyl vinyl ether) copolymer and the melt flow rate of said polytetrafluoroethylene are within the range of 20 g/10 min from each other, said polytetrafluoroethylene by itself having no tensile strength, said composition of said component retaining at least 90% of its tensile modulus after said exposure to said temperature for a time period of at least 1 week.

2. In the downhole well of claim 1 wherein said communications cable comprises at least one electrical conductor and electrical insulation surrounding said conductor and said component includes said insulation.

3. In the downhole well of claim 2 wherein said insulation is primary or secondary insulation.

4. In the downhole well of claim 1 wherein said communications cable comprises at least one optical fiber and protective material surrounding said optical fiber and said component includes said protective material.

5. In the downhole well of claim 1 wherein said communications cable has a lower end and a sensor positioned at said lower end, said sensor comprising either at least one electrical conductor or at least one optical fiber and a housing for protecting said electrical conductor or optical fiber, said component including a seal isolating the interior of said housing from said well and/or insulation for said electrical conductor or protective material for said optical fiber.

6. In the downhole well of claim 1 wherein said communications cable is power cable and said component includes electrical insulation for said power cable.

7. In the downhole well of claim 6, wherein said power cable includes a load-bearing element.

8. In the downhole well of claim 1 wherein said time period is at least 6 months.

9. In the downhole well of claim 1 wherein the melting temperature of said tetrafluoroethylene/perfluoro(alkyl vinyl ether) copolymer is greater than 300° C.

10. Downhole well power cable comprising (i) at least one electrical conductor, (ii) electrical insulation surrounding said conductor, and (iii) a load bearing element secured to said insulation, said insulation comprising the composition consisting essentially of 65 to 85 wt % melt-fabricable tetrafluoroethylene/perfluoro(alkyl vinyl ether) copolymer, said 15 to 35 wt % perfluoroalkyl containing 1 to 5 carbon atoms, and melt flowable polytetrafluoroethylene, to total 100 wt % based on the combined weight of said tetrafluoroethylene/perfluoro(alkyl vinyl ether) copolymer and said polytetrafluoroethylene, wherein the melt flow rate of said tetrafluoroethylene/perfluoro(alkyl vinyl ether) copolymer and the melt flow rate of said polytetrafluoroethylene are within the range of 20 g/10 min from each other, said polytetrafluoroethylene by itself having no tensile strength, said composition retaining at least 90% of its tensile modulus after said exposure to a temperature of at least 290° C. for a time period of at least 1 week.

11. The power cable of claim 10 wherein said conductor is formed from twisted together wires forming interstices at the surface of said conductor, and said insulation fills said interstices.

12. The power cable of claim 10 wherein said time period is at least 6 months.

* * * * *